L. O. GIBSON.
TIRE VALVE FOR TRUCK TIRES.
APPLICATION FILED AUG. 27, 1920.

1,376,868. Patented May 3, 1921.

Inventor
L. O. Gibson.

UNITED STATES PATENT OFFICE.

LEONARD O. GIBSON, OF RAWLINS, WYOMING.

TIRE-VALVE FOR TRUCK-TIRES.

1,376,868.  Specification of Letters Patent.  Patented May 3, 1921.

Application filed August 27, 1920. Serial No. 406,357.

*To all whom it may concern:*

Be it known that I, LEONARD O. GIBSON, a citizen of the United States, residing at Rawlins, in the county of Carbon, in the State of Wyoming, have invented a new and useful Tire-Valve for Truck-Tires, of which the following is a specification.

The object of my invention is to provide a valve of novel construction adapted to withstand the heavy air pressure to which valves for truck tires are subjected; and to provide the novel combination and arrangement of parts described and illustrated. I attain the objects of my invention by the mechanism illustrated in the accompanying drawings, in which—

Like numerals designate like parts in each of the several views.

Figure 1:
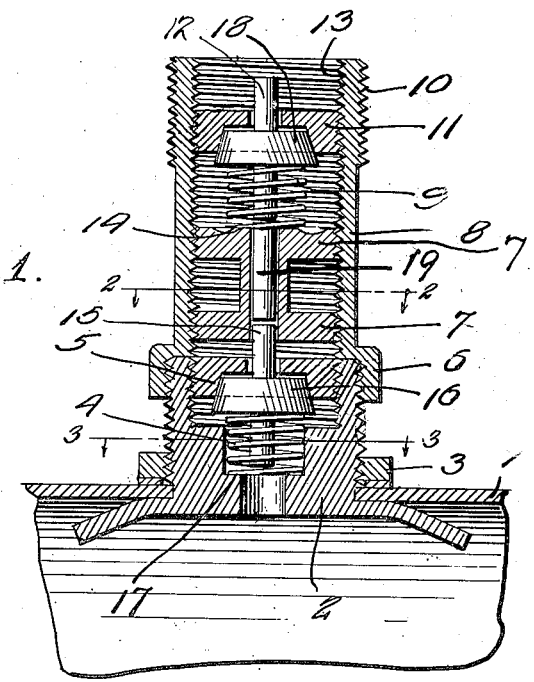
Figure 1 is a longitudinal section, partly in elevation through one of my valves.
Figures 2, 3:
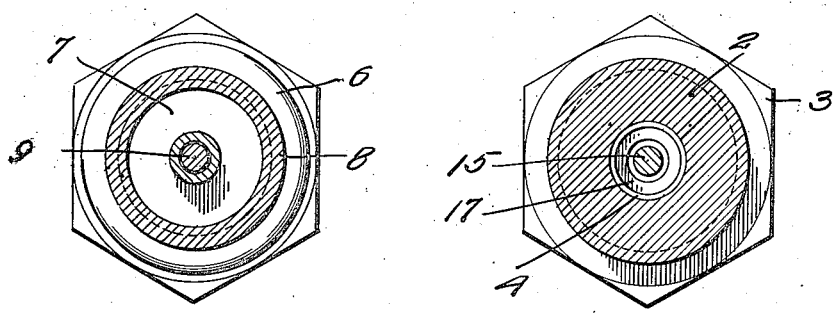
Fig. 2 is a transverse section through the valve on line 2—2 of Fig. 1.
Fig. 3 is a transverse section through the valve on line 3—3 of Fig. 1.

Referring to the accompanying drawings, I provide a valve shell 2 seated on the tire 1, as shown in Fig. 1 and threaded exteriorly and interiorly for a portion of its length as shown, and secured to the tire by a suitable nut 3. I provide a second valve stem 8 threaded interiorly and exteriorly for a portion of its length as shown, and having an enlarged threaded section 6 adapted to screw onto the lower valve shell 2. I provide a lower valve seat nut 5 in threaded engagement with the interior threaded portion of lower valve shell 2 and chambered to receive the frusto-conical valve 16 which is mounted on a suitable spindle 15 and releasably retained on its seat by a suitable coil spring 4, mounted in the chamber 17 in valve shell 2. I provide a similar frusto-conical valve 18 mounted on spindle 12 and releasably seated in the chambered portion of valve nut 11, which engages the interior threaded portion 13 of upper valve stem 8 and is releasably held on its seat by a suitable coil spring 9, which bears against the releasing pin guide nut 7 which is mounted in the lower end of upper valve shell 8, and which guides the releasing pin 19, the ends of which are adapted to be engaged by the corresponding ends of the spindles 12 and 15 respectively when it is necessary to unseat the valves 18 and 16 to permit of the escape of air from the tire and to permit of the pumping of air through the valve into the tire.

In operation it will be observed that upper valve shell 8 may be entirely removed without deflating the tire. When upper valve shell 8 is in place the two valves 18 and 16 both function to prevent the escape of air, and provide a valve adapted to withstand the heavy air pressure required in large tires such as are used on heavy trucks. The two frusto-conical valves effectively prevent escape of air and are normally held on their seats by the springs beneath, but may be released from their seats by pressure on the upper spindle 12, the lower end of which compacts with guiding pin 19, which in turn contacts with the end of spindle 15. With this device it is possible to more readily remove the tire, as the upper half of the valve may be unscrewed and the lower half of the valve being short may be readily pulled through the rim. The valves 18 and 16 are identical in size and shape and are consequently interchangeable, as are also nuts 11 and 5 on which the valves seat, respectively. Spindles 15 and 12 are of like length.

What I claim is:

1. In a tire valve adapted to withstand heavy air pressure, the combination of a valve shell, a second valve stem releasably secured to the first valve shell, independently disposed nuts in each of the valve shells, each of said nuts having valve seats, valves seated in the nuts, springs releasably holding the valves on their seats, spindles on which the valves are mounted and means operatively connecting the spindles so that pressure on the upper spindle will unseat both valves.

2. In a device of the class described, the combination of a lower valve shell, an upper valve shell releasably engaging the lower valve stem, nuts in each of the valve stems, each of said nuts having frusto-conical valve seats, frusto-conical valves releasably mounted on said seats, spindles on which each of said valves are mounted, spring means normally retaining the valves on their seats, and a pin alined with the spindles of the valves and of sufficient length to provide an operative connection between the spindles, whereby pressure on the uppermost spindle will unseat both the valves.

3. In a device of the class described, the combination of a relatively short lower valve shell, a relatively long upper valve shell releasably engaged on the lower valve shell, nuts having valve seats mounted in each of the valve shells, interchangeable valves, resilient means normally holding said valves on their seats, and longitudinally alined spindle and pin elements providing an operative connection between the two valves to permit of unseating both valves simultaneously, and means for securing the lower valve shell to the tire, substantially as set forth.

LEONARD O. GIBSON.